(12) United States Patent
Oakley et al.

(10) Patent No.: US 8,774,982 B2
(45) Date of Patent: Jul. 8, 2014

(54) HELICOPTER WITH MULTI-ROTORS AND WIRELESS CAPABILITY

(75) Inventors: John Robert Oakley, Morgan, UT (US); David Scott Heath, Conifer, CO (US)

(73) Assignee: Leptron Industrial Robotic Helicopters, Inc., Conifer, CO (US)

( * ) Notice: Subject to any disclaimer, the term of this patent is extended or adjusted under 35 U.S.C. 154(b) by 0 days.

(21) Appl. No.: 13/200,986

(22) Filed: Oct. 6, 2011

(65) Prior Publication Data

US 2012/0083945 A1 Apr. 5, 2012

Related U.S. Application Data

(63) Continuation-in-part of application No. 12/805,971, filed on Aug. 26, 2010.

(60) Provisional application No. 61/344,789, filed on Oct. 6, 2010.

(51) Int. Cl.

| G05D 1/00 | (2006.01) |
|---|---|
| B64C 27/08 | (2006.01) |
| G05D 1/08 | (2006.01) |
| B64C 39/02 | (2006.01) |
| H04N 7/18 | (2006.01) |
| B64C 25/32 | (2006.01) |

(52) U.S. Cl.
CPC .............. G05D 1/0858 (2013.01); B64C 27/08 (2013.01); *B64C 2201/108* (2013.01); B64C 39/024 (2013.01); G05D 1/0038 (2013.01); *B64C 2201/126* (2013.01); *B64C 2201/027* (2013.01); *H04N 7/185* (2013.01); *B64C 2201/024* (2013.01); *B64C 2025/325* (2013.01)
USPC ............................................. 701/2; 244/17.23

(58) Field of Classification Search
CPC ............ B64C 39/024; B64C 2201/127; B64C 2201/126
USPC ............................................. 701/2; 244/17.23
See application file for complete search history.

(56) References Cited

U.S. PATENT DOCUMENTS

| 5,377,934 | A * | 1/1995 | Hill | 244/17.11 |
|---|---|---|---|---|
| 5,609,312 | A * | 3/1997 | Arlton et al. | 244/17.11 |
| 6,810,310 | B1 * | 10/2004 | McBain | 701/3 |
| 2004/0118222 | A1 * | 6/2004 | Cornish et al. | 73/863.22 |
| 2005/0051667 | A1 * | 3/2005 | Arlton et al. | 244/17.11 |

* cited by examiner

*Primary Examiner* — Fadey Jabr
*Assistant Examiner* — Yazan A Soofi
(74) *Attorney, Agent, or Firm* — Jean C. Edwards; Edwards Neils PLLC (57) ABSTRACT

The present invention relates to a helicopter having a modular airframe, with multiple layers which can be connected easily, the layers which house the electronics (autopilot and navigation systems), batteries, and payload (including camera system) of the helicopter. The helicopter has four, six, and eight rotors, which can be easily changed via removing one module of the airframe. In one embodiment, the airframe has a vertical stacked appearance, and in another embodiment, a domed shape (where several of the layers are stacked internally). In one embodiment, there is a combination landing gear and camera mount. The helicopter allows for simple flight and usage by remote control, and non-remote control, users.

34 Claims, 6 Drawing Sheets

HELICOPTER WITH MULTI-ROTORS AND WIRELESS CAPABILITY

CROSS-REFERENCE TO RELATED APPLICATIONS

The present application claims priority from U.S. Patent Provisional Application No. 61/344,789, filed Oct. 6, 2010, and is a continuation-in-part (CIP) of U.S. patent application Ser. No. 12/805,971, filed Aug. 26, 2010, the contents of which are herein incorporated by reference in their entirety.

BACKGROUND OF THE INVENTION

1. Field of the Invention

The present invention relates to a helicopter, in reduced scale form, for industrial use, that includes a modular structure, multiple rotors and wireless capability. The reduced scale modular airframe helicopter is remotely controlled, and provides a high performance platform for high or low altitude surveillance, with a payload such as camera systems for photographic missions. The reduced scale helicopter of the present invention may be used for industrial use, for example in surveillance operations, such as border control, crime prevention, military reconnaissance, disaster reconnaissance, etc., and is reliable to achieve a maximum flight time with a minimum of down time. The reduced scale helicopter of the present invention is a state of the art unmanned aerial vehicle/unmanned aircraft system (UAV)/(UAS) helicopter with a built-in autopilot and navigation system that allows for simple flight and usage by remote control, ground station control and non-remote control users.

2. Description of the Relevant Art

Although reduced scale helicopters are in existence, they suffer from reliability problems, navigation problems, and have long delays in launch time. Further, present day helicopters suffer from a lack of features that would be advantageous in industrial use (used mostly as toys), and are not modular and upgradeable.

Thus, a reduced scale helicopter that could be used industrially, which includes state-of-the-art technology with high reliability, modularity, and upgraded features, such as multi-rotors and wireless capability, is desired.

SUMMARY OF THE INVENTION

The present invention relates to a modular airframe, multi-rotor reduced scale helicopter with wireless capability, that has UAV/UAS and has a built-in autopilot and navigation system that allows for simple flight and usage by remote control, ground station control and non-remote control, users. The reduced scale helicopter with multi-rotor system of the present invention typically includes, in one embodiment, a modular center airframe or chassis, which consists of five (5) layered sections.

In a first embodiment, each layer of the airframe of the helicopter has a state-of-the-art "quick connection" (i.e., snap fit, pin connectors, etc.) that allows each of the layers to be easily removed, and another or similar layer to be inserted with the same connections.

In one embodiment, the top (first) layer of the airframe contains a global positioning satellite (GPS) receiver electrical device which is connected via an electrical connection, to the autopilot system in the second layer. The GPS receives satellite data, which data is sent in real-time to the autopilot, which uses it to identify the location of the helicopter in latitude, longitude, altitude, and velocity, and in real-time.

The second layer includes any state-of-the-art Commercial-off-the-Shelf (COTS) autopilot, which is connected to the electrical panel. The autopilot connects via the central "quick connect" system to separate speed controllers for the different motors of the helicopter in the fourth layer. Because the autopilot system is serial and modular, the autopilot can control from 4-8 speed controllers and motors in the fourth layer. These connections allow the autopilot to direct each of the different motors in order to maneuver the aircraft in any of X, Y or Z directions in the air.

The autopilot is connected to a wireless communication transmitter/receiver in the second layer, which transmits and receives wireless instructions from the ground station. The autopilot is also connected to a standard RC receiver, and has an electrical connector board that connects it to the autopilot. This separate connection allows the standard RC wireless transmitter/receiver to send separate instructions to the autopilot for vehicle control.

The autopilot is also connected to the electrical system in the second layer. The electrical power panel/conditioning system controls each rotor that is contained in the fourth layer. This electrical system allows the batteries in the third layer, not to be "overcharged" or to stop expending energy before the discharge completely. This electrical device conditions the power and acts as an adjustable speed regulator for the motors in the fourth layer.

A daylight-readable 2"-4" LCD screen in the second layer, is connected via electrical wiring to the electrical panel and to the autopilot and other systems. Also mounted in the second layer is an optional data card which is used to save autopilot data collected from up to approximately 100 flights.

The helicopter has four, six, or eight rotors which are each connected via a shaft/wing to a separate speed controller. Each of the rotors is mounted horizontally on the end of shaft/wing, and at the top of the rotor is the rotor head assembly that has 2-6 rotor blades connected to it.

Each of the rotors' shaft/wing is connected in a "spoke" back to the main chassis in the fourth layer which allows for the shaft/wing to be connected and disconnected using a state-of-the art connector system. The chassis contains openings or slots for four (4), six (6), or eight (8) arms with associated motor speed controllers. Thus, the appropriate layer with the appropriate number of shaft/wings or arms and rotors can be chosen by the user in assembling the aircraft.

In one exemplary embodiment, each arm/wing is connected via a hinged "connect/disconnect" mechanism that allows the entire wing/arm with attached motor mount and motor to be folded in parallel with each other (i.e., vertically). The arms/wings can be opened via a spring or piston per arm/wing, that would allow either a user actuated "release" or an automated "release" for launch, for example, and the arms/wings would open up into a flight position after launch.

In one embodiment, a rotor guard connects to the arms/wings and extends ⅓" beyond the reach of the 4/6/8 blades, to allow the vehicle to come in contact with a vertical surface and the blades attached to the motors will not strike the vertical surface.

In one embodiment, the landing gear includes four (4) lightweight durable material, tubes that also slide into the fourth layer at a 45 degree angle with small rubber "feet" attached to the end, with the other end being attached inside the fourth layer via the "quick connect" system. In one embodiment, the landing gear can be folded parallel to one another for launch, and with a user-actuated or automated release, would spring back into landing position after launch.

In one embodiment, the helicopter carries a payload (i.e., camera) of several ounces to several pounds. In one embodiment, the camera system has the ability to allow for a remote wireless 2.4 Ghz RC transmitter and receiver system, for example, of a hand-held video and remote system, to remotely control a 360 degree left- and right-turning movement, with a 0-90 degree pan and tilt mechanism. This allows a user to move the camera while the helicopter is in operation at, for example, an altitude up to 12,000 ft, and a distance of up to 5 miles from the hand-held video and remote unit.

In a second embodiment, the helicopter layers are assembled together in a vertical, circular stacked arrangement, and are covered by a dome-shaped cover that secures to layer by suitable fasteners. In this second embodiment, there is a central core stacked shelf system, with the electronics disposed in an outer ring configuration around the fan of an air cooling system. In this configuration, the layers are implemented together, with the GPS disposed above the autopilot etc., and with the elements of the various layers being disposed in a ring-like configuration around the fan of the air cooling system.

In this second embodiment, a combination landing gear and camera mount is used. However, the combination landing gear/camera mount system can also be used with the first embodiment, with the landing gear legs of the first embodiment removed.

The helicopter has full autopilot operation via two separate modes—a hand-held remote control mode, and a ground station mode.

There has thus been outlined, some features that are consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

DESCRIPTION OF THE INVENTION

The present invention relates to a modular airframe, multi-rotor reduced scale helicopter 10 with wireless capability, that has UAV/UAS and has a built-in autopilot and navigation system that allows for simple flight and usage by remote control, and non-remote control, users. The present invention includes similar elements and features to the reduced scale helicopter disclosed in U.S. patent application Ser. No. 12/805,971 (and incorporated by reference), from which this application is a continuation-in-part (CIP).

Figures 1, 2:
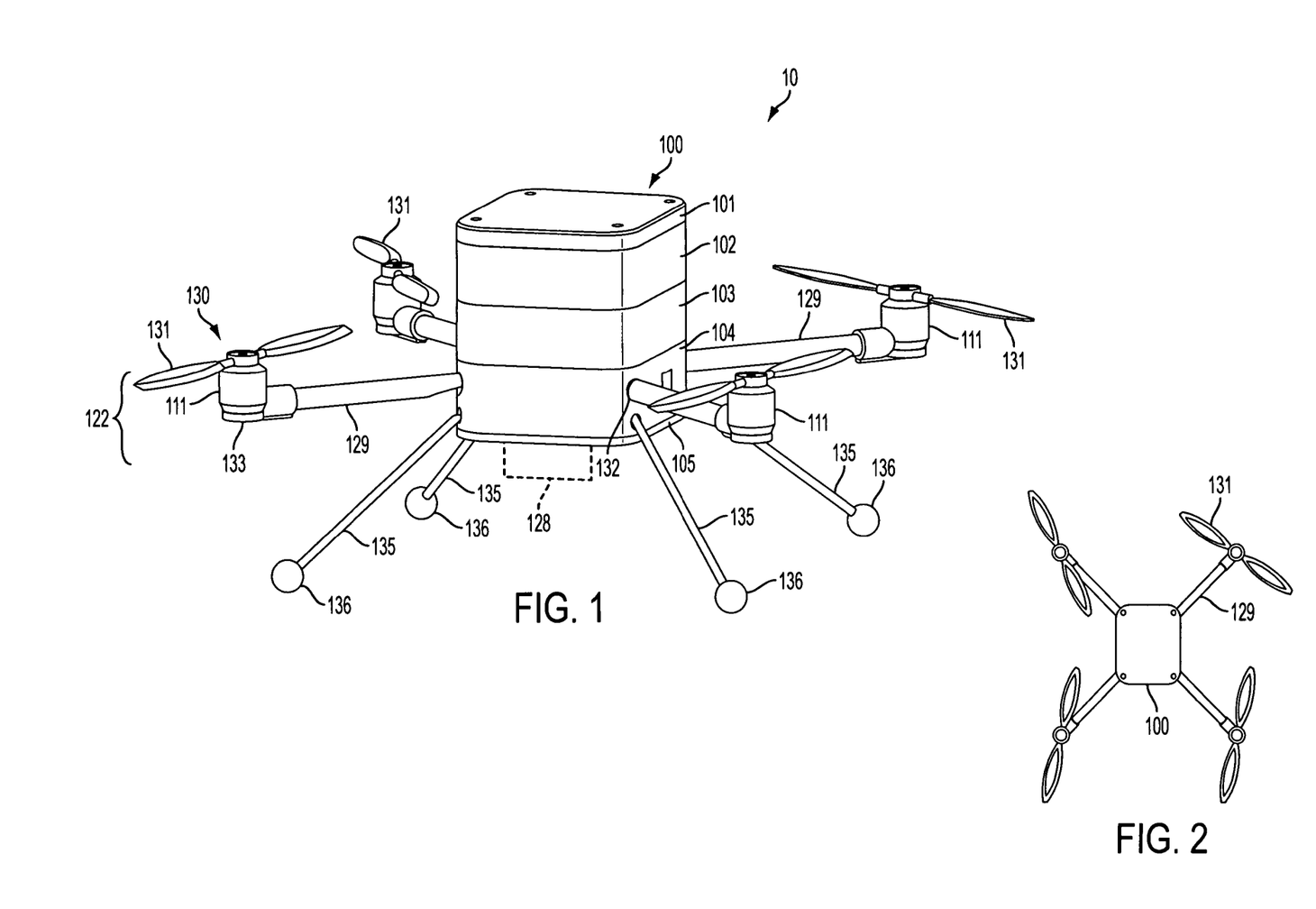
FIG. 1 is a perspective view of a schematic drawing of a first embodiment of the helicopter of the present invention.
FIG. 2 is a top view of FIG. 1
Figure 3:
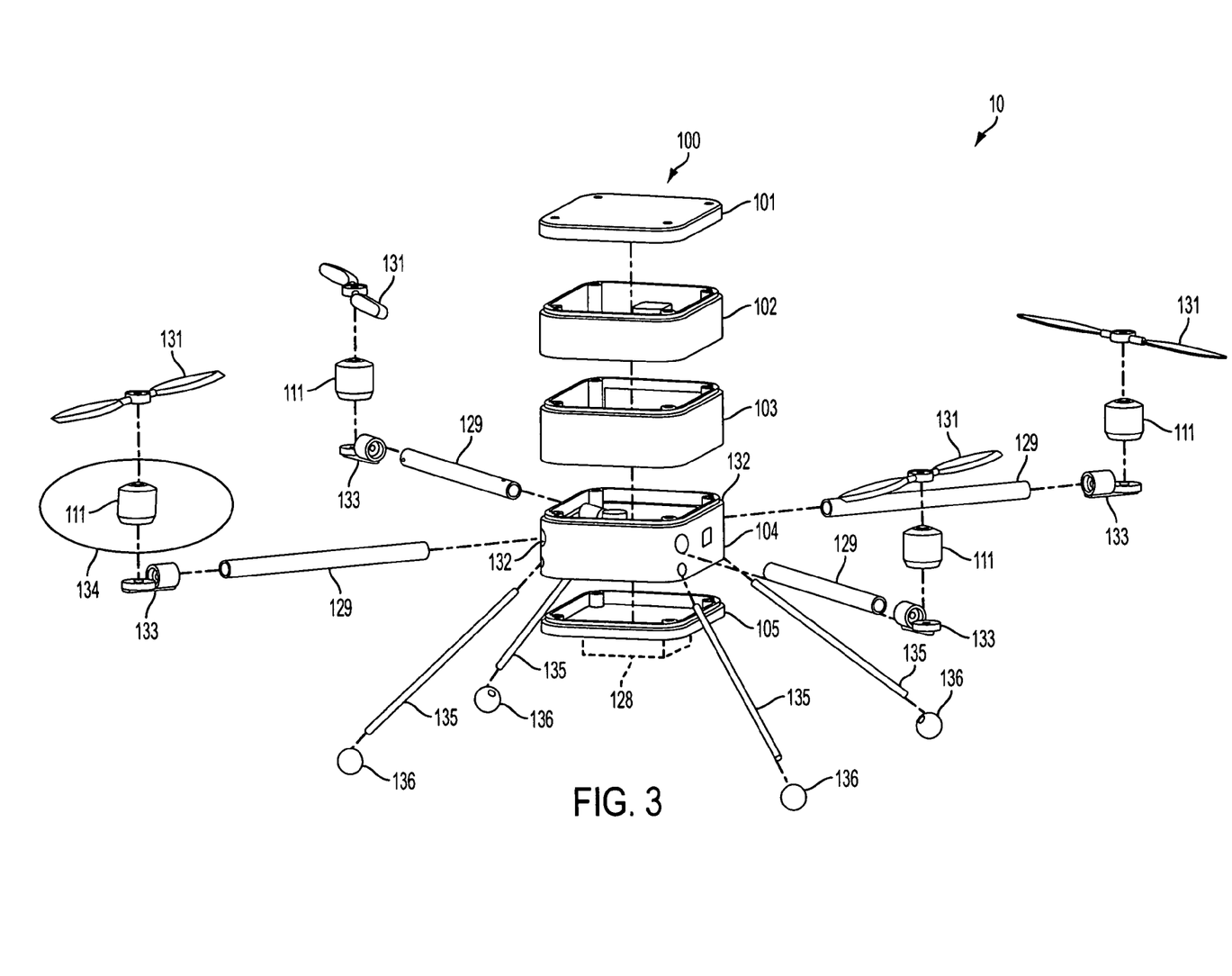
FIG. 3 is an exploded view of FIG. 1.

The reduced scale helicopter 10 with multi-rotor system of the present invention typically includes, in one embodiment, a modular center airframe or chassis 100, which consists of five (5) layered sections (101-105) (see FIGS. 1 and 3). However, one of ordinary skill in the art would know that more or less layers would be feasible, as long as the helicopter 10 has the disclosed operable features.

In a first embodiment, each layer 101-105 of the airframe 100 of the helicopter 10 has a state-of-the-art "quick connection" (i.e., snap fit, pin connectors, etc.) that allows each of the layers 101-105 to be easily removed, and another or similar layer to be inserted with the same connections.

The airframe or chassis 100 of the multi-rotor helicopter 10 of the present invention is comprised of a strong, durable material that is lightweight in order to reduce weight requirements for lift. In exemplary embodiments, the airframe 100 may be made of PVC plastic, carbon fiber, or injection-molded plastic and resin.

The reduced scale helicopter 10 of the present invention has standard dimensions, in an exemplary embodiment, of approximately 6-12 inches in height, 6-12 inches in length, a rotor diameter of approximately 6-12 inches (for each rotor), a weight of approximately 2-5 pounds, and engine power of approximately 0.25 Hp-1 Hp/motor (for each motor). However, one of ordinary skill in the art would know that the size and weight for lift of the reduced helicopter 10 depends on the scale desired, as long as the helicopter 10 meets the operable features described herein.

The layers 101-105 of the airframe 100 of the helicopter 10 are described as follows, but one of ordinary skill in the art would know that the elements described in each layer could be rearranged or provided in different layers as long as functionality is not affected. All elements in the layers 101-105 are grounded and attached to the body frame 100.

Figure 4:
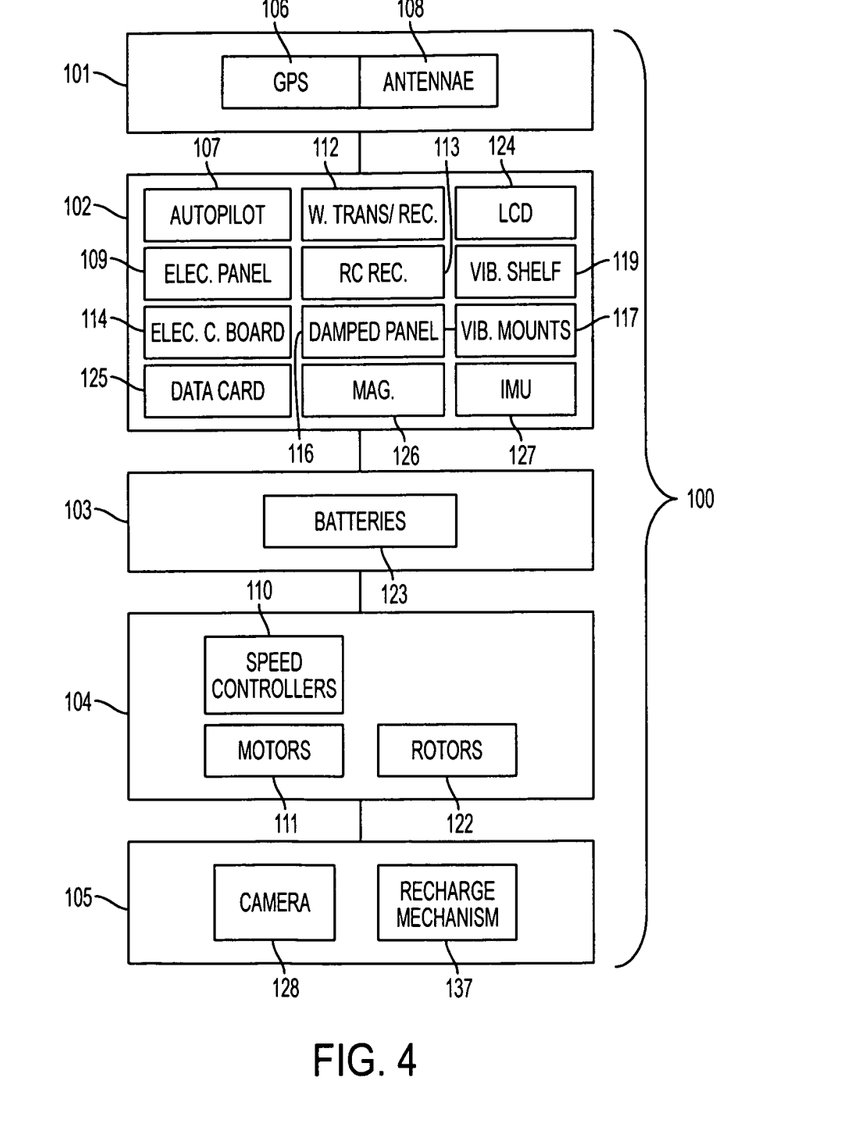
FIG. 4 is a schematic showing the elements of the layers of the helicopter according to the first embodiment of the present invention.
Figure 5:
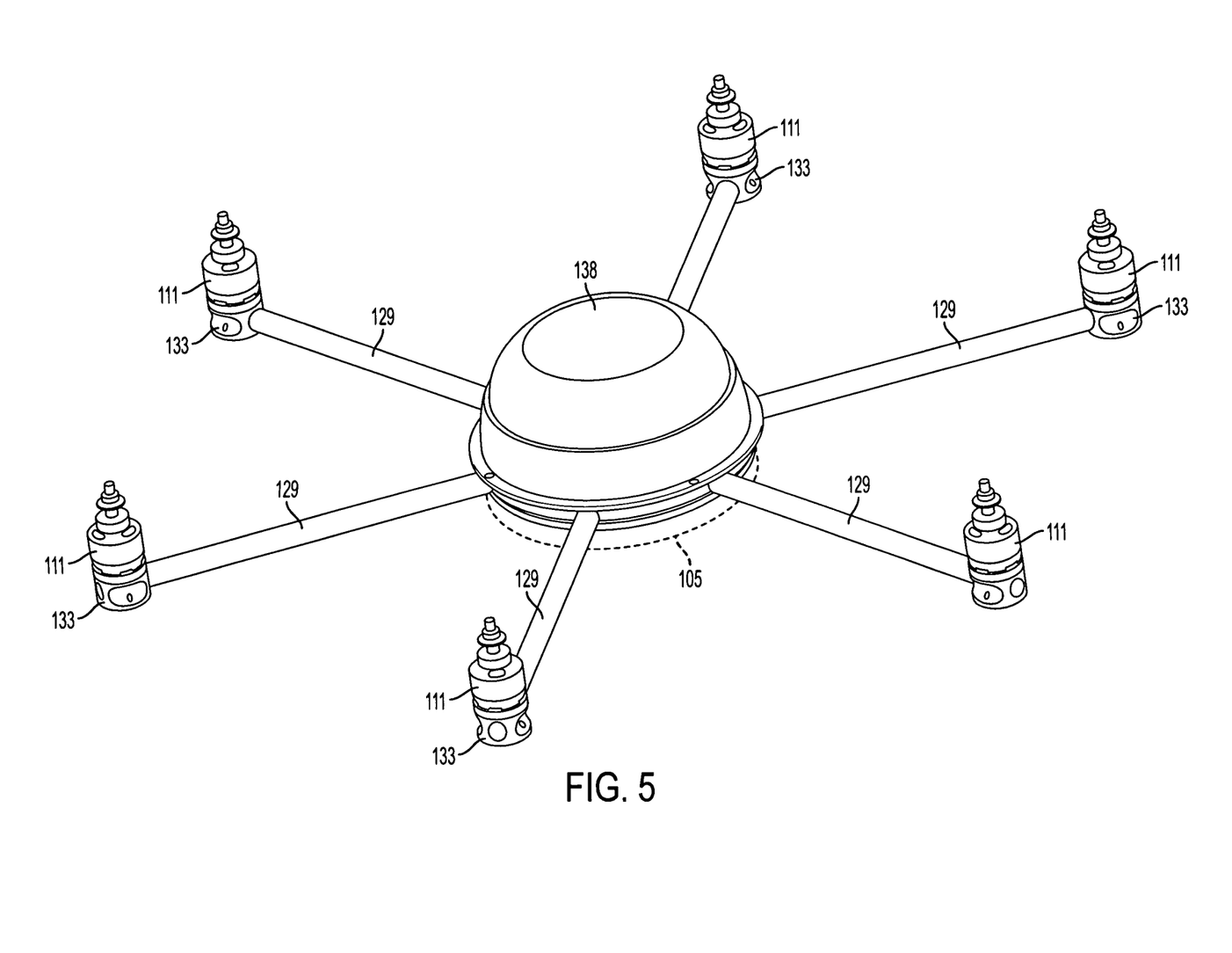
FIG. 5 is a perspective view of a partially assembled second embodiment of the helicopter of the present invention.

In one embodiment, layer 101 of the airframe 100 contains a global positioning satellite (GPS) receiver electrical device 106 (see FIG. 4), which is connected via an electrical connection, to the autopilot system 107 in layer 102. The GPS electrical device 106 is connected to GPS antennae 108 that receive satellite data, which data is sent in real-time to the autopilot 107, and which the autopilot 107 uses to identify the location of the helicopter 10 in latitude, longitude, altitude, and velocity, and in real-time. The GPS device 106 has a "quick connection" (as described above and throughout the present application) to the layer below (i.e., layer 102) for power, and data communications. The GPS module 106 can be a standard GPS card with antennae 108, and which works with all the major navigational systems in use to receive, for example, LP1, LP2, Omnistar™, or Glosnas™ systems.

The airframe 100 houses any state-of-the-art Commercial-off-the-Shelf (COTS) autopilot 107 in layer 102. The autopilot 107 is encased in a magnetic flux-resistant aluminum box lined with electromagnetic tape for electromagnetic interference (EMI) shielding. The autopilot system 107 is connected to the electrical panel 109, also in layer 102. The autopilot 107 then connects via the central "quick connect" system to separate speed controllers 110 for the different motors 111 of the helicopter 10, in layer 104. Because the autopilot system 107 is modular, the autopilot 107 can control from 4-8 speed controllers 110 and motors 111 in layer 104. These connections allow the autopilot 107 to direct each of the different motors 111 in order to maneuver the aircraft 10 in any of X, Y or Z directions in the air.

The autopilot 107 provides power and is connected to a wireless communication transmitter/receiver 112 in layer 102, which transmits and receives wireless instructions from the ground station (not shown, but described in U.S. patent application Ser. No. 12/805,971). The autopilot 107 is also connected to a standard RC receiver 113, and has an electrical connector board 114 that connects it to the autopilot 107. This separate connection allows the standard RC wireless transmitter/receiver 113 in layer 102 to send separate instructions to the autopilot 106 for vehicle control. The wireless receiver 112 has two (2) separate wireless antennae that are connected to, and receive power from the electrical connector board 114 of the helicopter 10.

The autopilot 107 may include standard processing and memory capability, including a central processing unit (CPU), RAM, wireless communication interfaces, and/or other components. The autopilot 107 may include, or be modified to include, software that may operate to provide various functionality, such as data gathering. The autopilot 107 may be implemented as an application run on existing computer operating systems. The autopilot 107 application may be ported to other personal computer (PC) software, and/or any other digital device with appropriate storage capability.

The processor of the autopilot 107 may access a memory in which may be stored at least one sequence of code instructions that may include the software program for performing predetermined operations. While the system of the present invention may be described as performing certain functions, one of ordinary skill in the art will readily understand that the software program may perform the function rather than the entity of the system itself. The memory may be a storage device that stores at least one data file, such as image files, text files, data files, audio files, video files, among other file types.

Further, although the above-described features and processing operations may be realized by dedicated hardware, or may be realized as programs having code instructions that are executed on data processing units, it is further possible that parts of the above sequence of operations may be carried out in hardware, whereas other of the above processing operations may be carried out using a software program. Further, although specific components of the system have been described, one skilled in the art will appreciate that the system suitable for use with the methods and systems of the present invention may contain additional or different components.

The autopilot 107 is connected horizontally to a damped panel 116 in layer 102. This damped panel 116 is then mounted via vibration mounts 117 in layer 102 (shown also in FIG. 6, for example). Thus, the autopilot 107 is contained inside of the airframe 100 with a dual vibration mount 117 from the X, Y and Z axes. There is a primary autopilot shelf 119 that is vibration isolated in the X and Y axes (see also FIG. 6, for example). All elements 107, 116, 117, 119 are set and mounted for shock and vibration via silicone bushings 118 in layer 102 (see also FIG. 6).

The autopilot 107 is also connected to the electrical system 109 in layer 102. The electrical power panel/conditioning system 109 controls each rotor 122 that is contained in layer 104. This electrical system 109 allows the batteries 123 (see layer 103) not to be "overcharged" or to stop expending energy before the batteries 123 in layer 103 discharge completely. This electrical device 109 conditions the power and acts as an adjustable speed regulator for the motors 111 in layer 104.

Also mounted inside the airframe 100 is a daylight-readable 2"-4" LCD 124 screen that is connected via electrical wiring to the electrical panel 109 and to the autopilot 107 and other systems in layer 102. This LCD 124 displays the status of the helicopter 10 and presents several different error codes in user-based languages (note: the helicopter 10 is set up with English as the primary language). The status and error codes which are programmed into the helicopter 10 software include: a) Status of the Autopilot; b) Satellite reception and grade of satellite reception; c) Power indication of % power used and % power available for both the main and autopilot sources; d) Helicopter 10 overall system health and ability to fly; e) Vehicle rotor RPM; and f) Stability mode of the helicopter 10—i.e., Fully Stabilized, Partially Stabilized, or Remote Control (RC) Mode.

Also mounted in layer 102 module is an optional data card 125. The data card 125 works in conjunction with the onboard electrical system 109, 114, LCD panel 124, and autopilot 107. This data card 125 is commonly known as a black box recorder, and is used to save autopilot 107 data collected from up to approximately 100 flights (amount predetermined and programmed). The autopilot system 107 posts full data from all in-flight sensors and data channels to the data recorder/memory. These data channels include all avionics (i.e., X, Y, Z motion, command inputs, GPS 106 data, ground station unit input, etc.), and custom sensors mounted on the mini-helicopter platform 10. The data card 125 is removable and allows for read-and-write capability.

In one embodiment, there are five (5) primary sensors, including a magnetometer 126 for compass headings, three (3) inertial measurement units (IMUs) 127 for X, Y and Z axis movements, and the GPS 106 for latitude, longitude and altitude), that indicate position and attitude of the helicopter 10 and feed into the primary power panel 109. In an exemplary embodiment, the magnetometer 126 is connected to the onboard GPS receiver 106, for example, and allows for the input of directional information to the autopilot 107 based upon magnetic compass readings.

The power of the mini-helicopter system 10 is powered with batteries 123 that are located in the battery compartment or layer 103 of the airframe 100. Each battery 123 has a +/– connection lead that plugs into the airframe 100 via a "quick release" connector. There are two (2) main 12 Volt-4,000-6,000 LiPo batteries that have "quick release" connectors that can "slide into" and lock, and "slide out" for replacement, and connect into the electrical panel 109 for use by the 4/6/8 rotors 130 in layer 104. There are battery terminals and transformers for the 12 volt systems.

In an alternative embodiment, layer 103 also includes the ability for a single "slide lock" battery unit 123, as disclosed in U.S. patent application Ser. No. 12/805,971. In an exemplary embodiment, this battery unit 123 has 2 LiPo batteries on the inside with a single housing and an integrated handle. This battery unit 123 is supported by a "rail" system on the bottom of layer 103 and a matching rail system on the top of the battery unit 123. This allows a user to pull a lever and "lock" or "release" the battery unit 123. Once the lever is set to lock, the battery 123 has a locking mechanism that will keep the battery unit locked to the primary chassis 100. Once the lever to release the battery unit 123 has been implemented, the battery unit 123 can be slid out from the primary chassis 100 and replaced with another unit. This allows the battery unit 123 to be recharged, and helicopter 10 to keep a full charge.

In one embodiment, the batteries 123 may be used in harsh weather, such as under temperatures from −20 to 120 Fahrenheit, and at high altitude situations above 10,000 feet, without loss of thrust and freezing or overheating.

The battery/power module 123 in layer 103 has a "quick connection" for the layer above (i.e., layer 102) and below (i.e., layer 105 and camera 128) for power, video, camera command channels (Pan/Tilt/Zoom) and data communications.

The power for the helicopter's 10 systems and propulsion are electric, and powered from battery layer 103. The on-board battery 123 supplies all power to the helicopter 10 for a flight time from 20 minutes to one (1) hour. However, one of ordinary skill in the art would know that the amount of battery life will affect flight time.

The 4/6/8 rotors 130 are each connected via a shaft/wing 129 to a separate speed controller 110 (see FIGS. 1-3 and 5). The shaft/wing 129 is connected to the main body 100 and each shaft/wing or arm 129 is connected to the respective speed controller 110 located inside of layer 104. Each of the rotors 130 is mounted horizontally on the end of shaft/wing 129, and at the top of the rotor 130 is the rotor head assembly 122 that has 2-6 rotor blades 131 connected to it. The rotor blades 131 may number 2-5 blades, and are made of an appropriate durable material such as carbon fiber, which allows for easy lift of the helicopter 10. The rotor head assembly 122 is secured to the rotor shaft by appropriate attachment mechanisms such as linkages.

Each of the rotors' shaft/wing 129 is connected in a "spoke" back to the main chassis 100 in layer 104 which allows for the shaft/wing 129 to be connected and disconnected using a state-of-the art connector system. At the end of the shaft/wing 129 there is an electrical quick connect element (not shown). When the shaft/wing 129 is slid into the hole 132 in layer 104, it will "click" into place using a "quick connect" mechanism, well known in the art (as described above). Once the shaft/wing 129 is connected, it has a mounting point inside (not shown), and electrical connections are made with the full electrical system 109 to provide power to the motor 111. The rotors 130 create both a lifting force, and a clockwise rotation of the helicopter chassis 100. As the rotors 130 turn and achieve the velocity needed for the aircraft 10 to lift from the ground, it generates a downward force. Also, layer 104, with 4/6/8 rotors 130 can be interchanged (increased from 4 to 6 or 8) to allow for larger payloads and greater lift.

The multi-rotor system of the present invention is designed to allow for 4/6/8 shafts/wings or arms 129 and rotors 130 to be connected by interchanging layer 104. The chassis 100 contains openings or slots 132 for four (4), six (6), or eight (8) arms 129 with associated motor speed controllers 110. Thus, the appropriate layer 104 with the appropriate number of shaft/wings or arms 129 and rotors 130 can be chosen by the user in assembling the aircraft 10. Layer 104 has a "quick connect" (i.e., pin connections, for example) with the layer above (i.e., layer 103) and below (i.e., layer 105) for power, data, and communications channels. Thus, layer 104 can be disconnected via a "quick release" mechanism, and changed from between the 4/6/8 arms 129.

The shaft/wings or arms 129 are designed as hollow airfoil shapes that allow the downward thrust from the rotors 130 to cleanly flow over them. One end of the arm/wing 129 has a motor mount 133 attached to it for rotor 130, which allows the motor 111 to be bolted or fixed to it. The other end of the motor mount 133 attaches to the arm/wing 129 and allows the electrical cables to be shielded inside the motor mount 133 and to be protected inside the hollow arm/wing 129 which runs into the center of layer 104. The 4/6/8 arms/wings 129 connect to the power/battery 123 in layer 103.

As stated above, each arm/wing 129 is connected via a "quick connect/disconnect mechanism", suitable in the state of the art, that allows the entire arm/wing 129 with attached motor mount 133 and motor 111 to be completely disconnected. At the end of the arm/wing 129 there is an electrical connection that when the arm/wing 129 is slid into layer 104, it will then "click" and power is now connected to the motor 111 at the end of the arm/wing 129. Should a motor 111 or arm/wing 129 no longer work, the arm/wing 129 can be removed and a new arm/wing 129 with attached motor 111 slid into place.

In one exemplary embodiment, each arm/wing 129 is connected via a hinged "connect/disconnect" mechanism that allows the entire wing/arm 129 with attached motor mount 133 and motor 111 to be folded in parallel with each other (i.e., vertically). The arms/wings 129 can be opened via a spring or piston per arm/wing 129, that would allow either a user actuated "release" or an automated "release" for launch, for example, and the arms/wings 129 would open up into a flight position after launch.

In one embodiment, a rotor guard 134 is a ring that connects to the arms/wings 129. This ring extends ⅛" beyond the reach of the 4/6/8 blades 131. This allows the vehicle 10 to come in contact with a vertical surface and the blades 131 attached to the motors 11 will not strike the vertical surface. The rotor guard 134 is a single circular piece of plastic or carbon fiber.

In one embodiment, the landing gear includes four (4) lightweight durable material, tubes 135, such as carbon fiber tubes 135, that also slide into layer 104 at a 45 degree angle with small rubber "feet" 136 attached to the end, with the other end being attached inside layer 104 via the "quick connect" system. In one embodiment, the landing gear 135 can be folded parallel to one another for launch, and with a user-actuated or automated release, would spring back into landing position after launch.

In one embodiment, the helicopter 10 carries a payload (i.e., camera 128) of several ounces to several pounds. The camera mount is disposed in layer 105 and includes a single plate that is modular and has a "quick release" mechanism from layer 104. The camera mount contains power, video, camera command channels (Pan/Tilt/Zoom) and data communications, and is described in U.S. patent application Ser. No. 12/805,971. This single plate creates a shelf for any type of camera system 128. The single plate is connected to two (2) side plates with a gear system that is connected to a servo (see U.S. patent application Ser. No. 12/805,971) that allows for 0-180 degree tilting. Further, layer 105 can be easily disconnected and connected from layer 104 to insert another camera 128 system and mount, with the appropriate "quick release" pin connectors.

In one embodiment, the camera system 128 has the ability to allow for a remote wireless 2.4 Ghz RC transmitter and receiver system, for example, of a hand-held video and remote system, to remotely control a 360 degree left -and right-turning movement, with a 0-90 degree pan and tilt mechanism. This allows a user to move the camera 128 while the helicopter 10 is in operation at, for example, an altitude up to 12,000 ft, and a distance of up to 5 miles from the hand-held video and remote unit.

This single plate creates a shelf for any type of camera system 128, such a high-definition (HD) camera, single lens reflex (SLR) camera, HD video, thermal imaging, night vision and infrared camera, or color block camera (e.g., FLIR Infrared Camera/Model Photon 320, or Sony FCB-EX/Color Block Camera). In one embodiment, the camera 128 used may be military-qualified with thermal imaging, usable in a wide range of temperatures, with 8- or 14-bit digital video formats, digital zoom, image polarity, image colorization, video motion detection, picture freeze, etc. An additional battery may be used to power the camera system 128.

In additional embodiments, there may be alternative payload arrangements used with the helicopter 10 of the present invention. In another alternative embodiment, the payload or camera system 128 is a hanging payload, and mounted hanging below the helicopter 10 by a cable (see U.S. patent application Ser. No. 12/805,971).

In one embodiment, an automated recharge mechanism 137 is supported in a full connection unit on the bottom of layer 105. This recharge mechanism 137 allows for a positive and negative receiving unit, such that an external connection device can be connected for automated charging (see U.S. patent application Ser. No. 12/805,971). This allows for the entire battery system to be charged without removing the batteries 123.

In a second embodiment, the helicopter 10 layers 101-104 are assembled together in a vertical, circular stacked arrangement, and are covered by a dome-shaped cover 138 that secures to layer 104 (see FIGS. 5-7) by suitable fasteners. The elements described in this embodiment, are similar to the first embodiment described above, and uses similar reference numerals.

In this second embodiment, there is a central core stacked shelf system, with the electronics disposed in an outer ring configuration around the fan of an air cooling system 139. In this configuration, layers 101-104 are implemented together, with the GPS 106 disposed above the autopilot 107 etc., and with the elements of layers 102 and 104 disposed in a ring-like configuration around the fan of the air cooling system 139 (see FIG. 6).

In the air cooling system 139 of the helicopter 10, a temperature sensor will turn on a fan 140 which will pull in cool air from the outside of the helicopter 10 and push that air through the air cooling ducts (4/6/8) 141—one each for each of the motors 111/speed controllers 110—and over the electronics (i.e., 107, 109, 110, 112, etc.), etc., to create a lower internal temperature. The temperature gauges can be set by the user, and the air temperature will be monitored by the autopilot 107.

Figure 6:
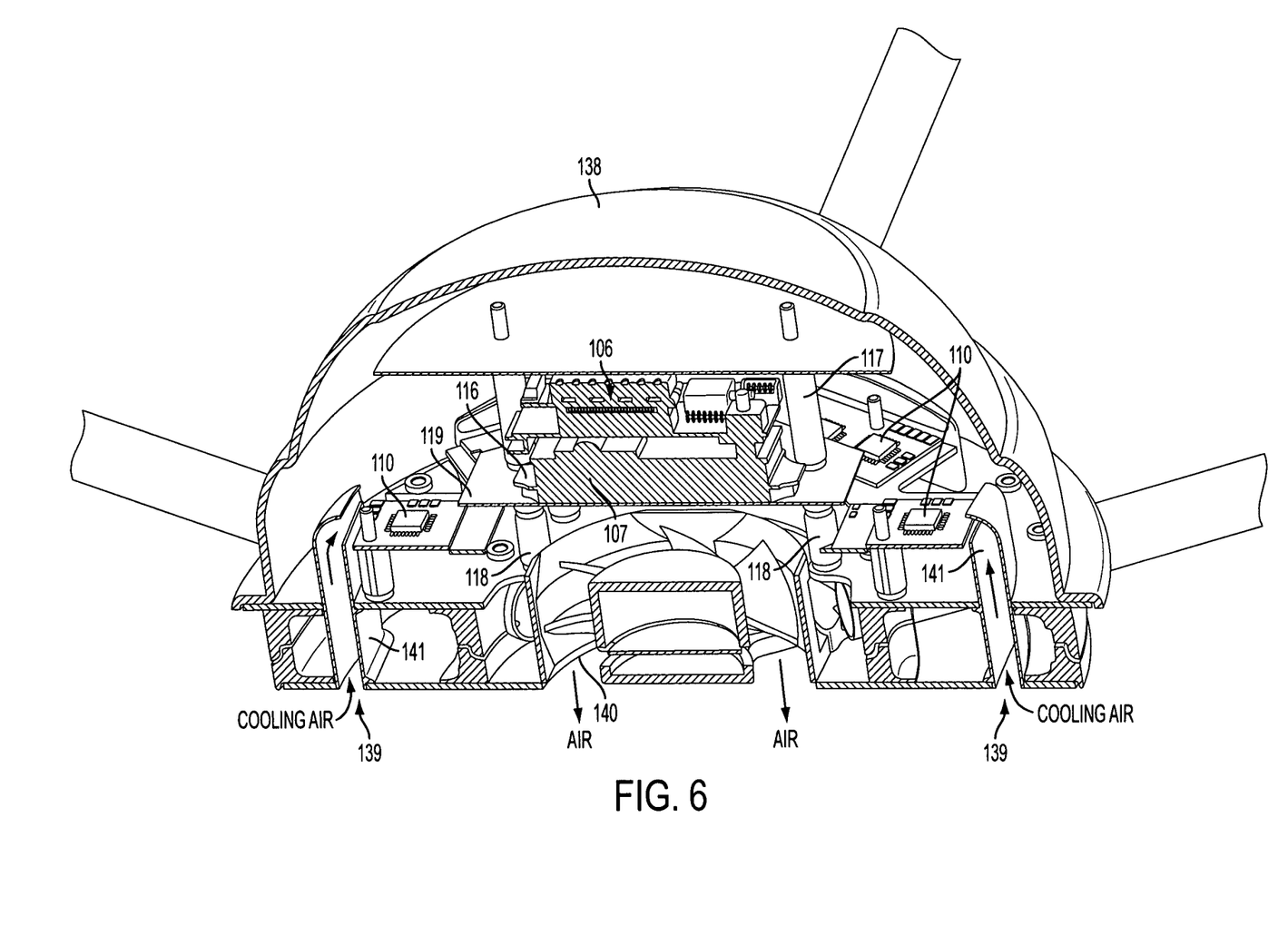
FIG. 6 is a cross-sectional view of the internal features of the airframe of FIG. 5.

Not shown in FIG. 6, is layer 105, which is described as above, and which includes the camera 128 system.

Figure 7:
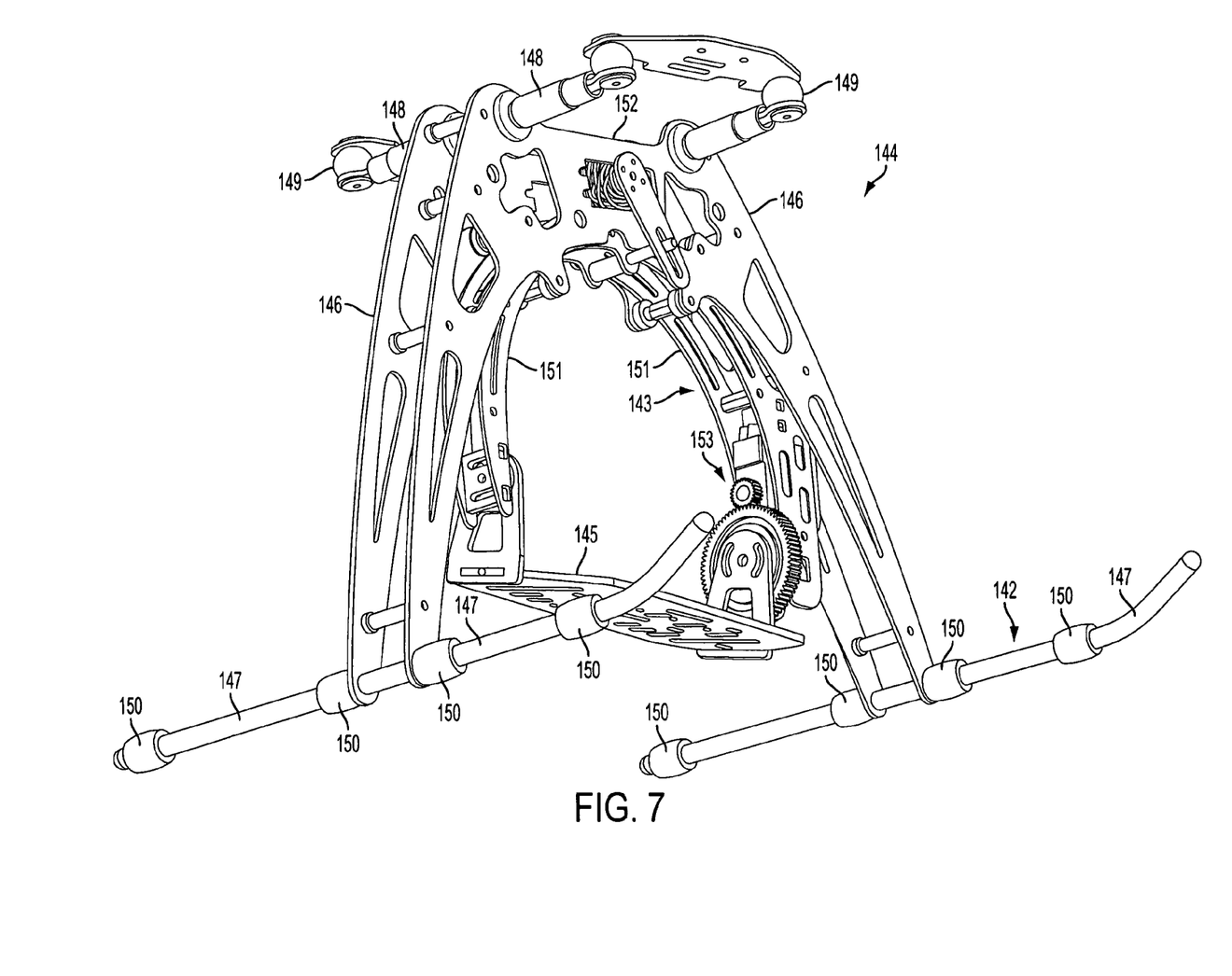
FIG. 7 is a perspective view of the combination landing gear and camera mount of the helicopter according to the second embodiment of the present invention.

In this second embodiment, a combination 144 landing gear 142 and camera mount 143, is used (see FIG. 7). The camera 128 (not shown in FIG. 7) is mounted to shelf plate 145, and the camera mount 143 includes a semicircular camera mounting frame 151 which is connected to two (2) semicircular framing elements 146, that connect, to each other and to the landing gear legs 147. The mounting frame 151 and framing elements 146 may be made of a lightweight durable material such as carbon fiber or PVC plastic. The framing elements 146 are connected at the top to four (4) "quick connect" pins which connect to layer 105 via bolts 149.

Mounted to the top of the arch of the framing elements 146 is a servomechanism 152 that allows the camera 128 to pan, and a servo/gear system 153 which allows 0-90 degree tilting of the shelf 145.

The landing gear 142 of FIG. 7, includes two (2) parallel tubes 147 that are connected to the framing elements 146, and are made of a lightweight durable material such as carbon fiber or PVC plastic. The landing gear legs 147 include protective rings 150 made of a similar material. The landing gear legs 147 may be hollow tubes for weight requirements, for example, and may also be made longer or shorter to create more space from the ground to the main chassis 100 when the helicopter 10 is sitting on any surface.

The combination landing gear/camera mount system 144 can also be used with the embodiment of FIG. 1, and attached to layer 105, with the landing gear legs 135 of FIG. 1 removed.

The helicopter 10 has full autopilot operation via two separate modes.

In one embodiment, wireless video receiving and viewing allows for an operator on the ground to view and operate the remote camera system 128 located on the helicopter 10. In an exemplary embodiment, the first part of the system includes at least one camera 128 mounted on the helicopter 10, connected to a video transmitter, which may be a wireless video link such as an analog, digital or WiFi video transmission/receiver (for example, a 900-5 GHz transmission analog, or Digital or WiFi device), that sends video and still photo signals wirelessly to the video and remote gimbal operation unit—whether hand-held, or at a ground station (see U.S. patent application Ser. No. 12/805,971).

Hand-Held Remote Control Unit

In an exemplary embodiment, the hand-held remote control unit includes, for example, a video receiver/transmitter (for example, a 900-5 GHz transmission in analog, digital, or WiFi), disposed in a primary assembly or housing, such as a metal (i.e., aluminum powder-coated) frame (see U.S. patent application Ser. No. 12/805,971 for description). The hand-held remote control unit includes antennae for receipt of the video transmission broadcast by the helicopter 10, and an associated plug which connects to the LCD screen on the front side of the hand-held remote control unit. In one embodiment, the LCD screen is a flat panel LCD, such as a daylight "High Bright" with sizes from 32 inches to 4 inch screen, for example, that offers the ability to range in brightness from approximately 1,000 NIT's of brightness to ½ NIT. In one embodiment, the unit may also include dual RCA inputs and picture-in-picture video for screen systems.

In an exemplary embodiment, there is a standard operation remote control assembly with circuits and boards on the back side of the hand-held remote control unit, which would be familiar to one of ordinary skill in the art. The remote control assembly includes joy sticks (for example, 2.4 GHz R/C control sticks with programmable settings and sensitivities) disposed on the front side of the hand-held remote control unit, on either side of the LCD screen, for operation of the helicopter 10 and the payload, such as a camera 128. The R/C mode allows the user to utilize the wireless R/C controls to wirelessly rotate the camera 360 degrees and pan and tile 0-90 degrees via the 2.4 GHz method. This also allows via a wireless 900-5 GHz transmitter on the helicopter to transmit to the active station video.

In one embodiment, the operation of the camera 128 includes three (3) degrees of motion for the camera 128, including pan and tilt, up and down, and spinning 360 degrees in a circle. In one embodiment, there is a second data channel for the operation of the camera 128 including zoom, shutter, focus and other applicable camera functions, or for other payload functions.

In one embodiment; a portable 12 volt battery pack and integrated wiring is included in the housing (see the back side of the hand-held remote unit, as shown and described in U.S. patent application Ser. No. 12/805,971). In one embodiment, the complete frame and equipment of the hand-held remote control unit weighs approximately 5 lbs or less. In one embodiment, there is also an associated optional shoulder strap and harness to fit around the user's neck for ease in holding the hand-held remote control unit.

In one embodiment, the hand-held remote control unit described above, allows the user to utilize the joysticks to send wireless signals to a matching R/C receiver 113 as input to the helicopter 10 and onboard autopilot 107. This 2.4 GHz Remote Control (R/C) receiving unit 113 connects to the power panel 108 that relays the commands from the ground RIC unit for the tilting and maneuvering of the rotors 122. This input is also plugged into the primary electrical panel 108 and is used by the autopilot 107. The electrical panel 108 may also include an LED for Autopilot engagement, LED for GPS tracking 'On/Off', LED for Battery strength with indicator shows as RED via the LED to visualize when the overall system battery strength has reached ¼ strength.

Ground Station Unit

The ground station unit is similar to the hand-held remote control unit, and includes the elements described above with the exception of the remote control assembly with joy sticks, and the harness (see U.S. patent application Ser. No. 12/805, 971 for description). The ground station unit includes a rechargeable battery. In one embodiment, the LCD screen may be larger, such as a 15" 1,000 NIT daylight viewable screen, connected to an active video, for example. As with the hand-held remote control unit, the LCD screen offers a picture-in-picture for two (2) simultaneous video feeds from the transmitter on the helicopter 10. This mode allows the user to view via a wireless 900-5 GHz transmitter on the helicopter 10 to transmit to the active station video and a matching wireless video receiver shows the transmission on the station. The ground station has an active video stabilization unit, and a durable frame (i.e., aluminum) that contains the battery, dual video receivers and connections for the input to the video screen.

In one embodiment, the ground station unit includes a portable DVR, one for each RCA channel (i.e., two DVRs), and an additional high gain antenna/patch panel for additional gain.

In one embodiment, the ground station unit is supported by a stand, such as an aluminum tripod with extendable legs, mounted on the back side of the ground station unit at a bracket.

In an exemplary embodiment, the ground station unit utilizes both a remote control (R/C) and/or wireless-connected computer (such as a computer laptop (not shown)) configured with a wireless RS232 port, for example, which operates a software program specific to the present invention. This mode allows both controllers to be sending information to the helicopter 10 for controls and input via GPS position information.

As stated above, the helicopter 10 of the present invention has a wireless communication data link (for example, 900 MGHz-2.4 GHz) with the ability to transmit and receive flight instructions to and from the helicopter 10 and the ground station. The ground station has the ability to send input commands to the helicopter 10 via, for example: a) the remote control wireless controller, or b) a computer (not shown) configured with flight software connected to the wireless data link. Thus, the ground station allows the helicopter 10 to be managed fully from the ground station software program via a wireless modem transmission/receiving signal.

Also, the software allows for the ability to trigger camera and remote video via payloads at specific points. The software also shows 'real time' elements of the Helicopter health including battery, telemetry connectivity and other key attributes. The user always has the flexibility to switch during a mission into Assisted Mode (use of the R/C Controller without input from the laptop), RC Mode (with no autopilot at all), or Home Mode (allows the helicopter to return to a pre-determined GPS point and either hover, or land and turn off all rotors/motors).

With respect to the computer and software program, one of ordinary skill in the art would know that any state-of-the-art computer, particularly a laptop, may be used with the present invention. The present invention has the ability to specify via any computer code (i.e., XML, user interface, data files, Microsoft Windows® user interface or other computer elements), commands to control the helicopter 10. The computer may include standard processing and memory capability, including any of a central processing unit (CPU), parallel processor, RAM/ROM with a program, USB interface, telephone interface, microphones, speakers, a computer mouse, a wide area network interface, image display device, local area network interfaces, hard disk drives, DVD/CD readers/burners, a keyboard, wireless communication interfaces, and/or other components. The computer used with the present invention may include, or be modified to include, software that may operate to provide data gathering and data exchange functionality. The invention may be implemented by an application that resides on the computer, wherein the application may be written to run on existing computer operating systems. Users may interact with the application through a graphical user interface. The application may be ported to other personal computer (PC) software, personal digital assistants (PDAs), cell phones, and/or any other digital device that includes a graphical user interface and appropriate storage capability.

While the system of the present invention may be described as performing certain functions, one of ordinary skill in the art will readily understand that the program may perform the function rather than the entity of the system itself The program that runs the application may include separate programs having code that performs desired operations. Thus, the program may include a plurality of modules that perform sub-operations of an operation, or may be part of a single module of a larger program that provides the operation.

The memory or storage device may store at least one data file, such as image files, text files, data files, audio files, video files, among other file types. The data storage device may include a database, such as a centralized database and/or a distributed database that are connected via a network.

According to one embodiment, the present invention may be implemented using software applications that reside in a client and/or server environment. According to another embodiment, the present invention may be implemented using software applications that reside in a distributed system over a computerized network and across a number of client computer systems. Thus, in the present invention, a particular operation may be performed either at the computer, a server, or both.

Further, although the above-described features and processing operations may be realized by dedicated hardware, or may be realized as programs having code instructions that are executed on data processing units, it is further possible that parts of the above sequence of operations may be carried out in hardware, whereas other of the above processing operations may be carried out using software.

The underlying technology allows for replication to various other sites. Each new site may maintain communication with its neighbors so that in the event of a catastrophic failure, one or more servers may continue to keep the applications running, and allow the system to load-balance the application geographically as required.

Further, although aspects of one implementation of the invention are described as being stored in memory, one of ordinary skill in the art will appreciate that all or part of the invention may be stored on or read from other computer-readable media, such as secondary storage devices, like hard disks, floppy disks, CD-ROM, a carrier wave received from a network such as the Internet, or other forms of ROM or RAM either currently known or later developed. Further, although specific components of the system have been described, one skilled in the art will appreciate that the system suitable for use with the methods and systems of the present invention may contain additional or different components.

Method of Operation

In an exemplary embodiment, the autopilot 107 of the helicopter 10 of the present invention is operated in two separate modes: 1) via a wireless hand-held remote control unit (without computer programming/software), and 2) via a ground station unit (with computer programming/software) (see U.S. patent application Ser. No. 12/805,971 for description). The primary pilot handles the ground station mode, with the safety pilot handling the hand held remote control mode; and in some cases, the primary and safety pilot are one and the same when only a hand-held remote control unit is used. With either mode, the helicopter 10 can be placed into flight in a matter of minutes, providing flexibility and advantages of rapid deployment to the user.

a) Pre-Flight Checklist

In both modes of operation, the user follows a pre-flight checklist, with a specific pre-flight checklist for each mode of operation (i.e., hand-held or ground station).

Generally, in one embodiment of the overall pre-flight checklist, the user then turns on the helicopter 10, at an on/off switch, and ensures the autopilot 107 is "ON" (LED is lighted), and then performs a gimbal and video check. This gimbal and video check is performed by ensuring power is being provided to the video transmitter, the payload (for example, camera 128), the computer modem (if applicable), the camera 128 transmitter (if applicable), the gimbal/gear system of the camera mount, the LCD panel on the hand-held remote or ground station, and the LCD transmitter. The user then checks the signal strength of the live video.

At this time, the user may check the main power flight batteries 123 on layer 3, and then check that all is clear on the flight line (i.e., powering "ON" of rotors 130).

In one embodiment of the hand-held remote control unit operation, the user checks the battery 123 voltage to ensure that the target minimum for flight is available. The user would also check all the mechanical connections, including the rotors 130, the layer connects 101-105, and the landing gear. The video transmitter would be checked to ensure remote control is selected, and all LEDs should be "ON", and the throttle trim setting should be checked. The GPS 106 should be "ON" and the status on the LCD 124 should be "OK" for all systems. The user can then check the joy stick operation on the hand-held remote control unit, with, for example, the throttle/rudder being operated by the left joy stick, with throttle being forward/backward, a counterclockwise direction on the throttle being the rudder and left/right, and the right joy stick used for elevator/aileron.

In another embodiment for the ground station checklist, the user must run through checks on the computer in addition to the above pre-flight checklist of the helicopter 10 itself. In this case, the user would turn on the computer at the ground station, and bring up the software program that handles the helicopter 10 flight. The ground station should be on A/C power (for example, more than 14 volts), or the user should ensure that the batteries on the helicopter 10 are sufficient for flight.

Specifically, in one embodiment, the user should verify that the icons which denote the helicopter 10 and ground station on the computer screen, are in the expected map area (i.e., that the GPS 106 telemetry is working properly). The GPS 106 count, the number of satellites, and the position dilution of position (PDOP) of the GPS 106 should be checked and verified, and radio settings requested. If waypoints are to be scheduled (discussed further below), the user should validate the sequence and the order of same. The user should check the mission limits, such as height maximum/minimum, flight battery time, flight termination conditions, and communications timeout (where lack of communications triggers a safety return (described later)), as well as the command settings (i.e., vehicle velocity, altitude, etc.—usually automatic). The helicopter 10 controls should be checked for pitch, rolling, collective, and yawing, as well as tilt forward, backward, lift up for artificial horizon, and for operation of the inertial measurement units (IMUs) in the autopilot 107 (used by the safety pilot).

Once all the safety and flight operation testing and checklist are performed by the user, if all systems are ready and the helicopter 10 can be flown, the user may begin flight operations using either the hand-held remote control unit or the ground station unit. Aircraft traffic should be checked and any radio calls mandated by air traffic control should be made. The operation of the flight mission can be timed by the user or the computer.

b) Hand Held Video Operation

In this exemplary mode, the wireless remote control unit sends wireless signals to the matching RC receiver 164 as input to the helicopter 100 and autopilot 157. The user utilizes the two joy sticks on the wireless remote control 1 as input to the onboard helicopter autopilot 107, and the autopilot 107 then interprets the input commands from the joy sticks to create outputs from the autopilot 107 to the helicopter 10 for flight: up, down, tail left, tail right, forward, backward, left sideways, right sideways. The autopilot 107 issues the appropriate commands via an electrical output to the onboard helicopter control mechanisms (i.e., rotors 130, motors 111, and servomechanism, etc.), that control the helicopter 10.

In one embodiment, in the hand-held remote control mode, the user may utilize the wireless control system to send and receive camera 128 and gimbal functions, including, for example: i) three (3) degrees of motion for the camera 128, including pan and tilt, up and down, and spinning 360 degrees in a circle. As stated above, a second data channel may be used for the operation of the camera 128 including zoom, shutter, focus and other applicable camera 128 functions.

c) Ground Station Video Operation

In this exemplary mode, both a ground station unit, with a wireless connected computer running helicopter operational software, are used. The ground station unit includes a second wireless communication data link with the ability to transmit and receive flight instructions to and from the helicopter 10 to the ground station. The ground station unit has the ability to send input commands to the helicopter 10 by: a) the remote control wireless controller, or b) a computer configured with flight software connected to the wireless data link. The ground station mode allows the helicopter 10 to be managed fully from the software program run from the computer via a wireless modem transmission/receiving signal.

In this exemplary embodiment, and similarly to the hand-held remote control unit, the helicopter 10 is controlled, via the autopilot 107, but from the ground station unit, for flight, including: up, down, tail left, tail right, forward, backward, left sideways, right sideways. The ground station unit, thus, issues the appropriate commands via the wireless modem transmission/receiving signal, to the onboard helicopter control mechanisms (i.e., rotors 130, motors 111, and servo-mechanism, etc., that control the helicopter 10.

Thus, as stated above, the user may utilize the ground station unit to command the autopilot 107 to control payload functions, such as camera 128 functions. In one embodiment, the camera 128 and gimbal functions, including: i) three (3) degrees of motion for the camera 128, including pan and tilt, up and down, and spinning 360 degrees in a circle. As stated above, a second data channel may be used for the operation of the camera 128 including zoom, shutter, focus and other applicable camera 128 functions.

d) Features of Camera Payload

In one embodiment, whether using the hand-held remote control unit or ground station unit, the present invention includes a feature for an automated command to be sent from the autopilot 107 to the payload, i.e., the remote control camera 128. The command would be an electronic trigger for the camera 128 to automatically take photographs in any direction. The user may command this automatic feature detailing when (time), where (GPS, altitude), and how (helicopter 10 vehicle attitudes), the photographs would be automatically taken by the camera 128. The user may use the data and the photographs captured, to create a mosaic, for example. The helicopter will travel in a search and rescue pattern to capture an entire area with photos. End user requires a list detailing when (time), where (GPS, altitude), and how (vehicle attitudes) a photograph was automatically taken.

In an exemplary embodiment, the autopilot 107 of the present invention can also trigger automatic photographs to be taken in accordance with the following functions, for example: the number of waypoints or GPS specified points; the altitude of these waypoints; the specific latitude and longitude of the waypoints or GPS specified points; the forward velocity of the helicopter 10 between any of these points; and the percentage overlap of the photos to be taken. The total combination creates the ability to pick "n"-number of points for the autopilot 107 to follow.

In an exemplary embodiment, the autopilot 107 of the present invention has the ability to send an electronic command to the camera 128, and simultaneously to data log the commands of the latitude, longitude, altitude and exact X, Y and Z velocities. These elements will be entered into a data file from the real time data coming from the autopilot 107 and readable by any type of common computer software program (i.e., XML, and Comma Delimited file).

e) Onboard Helicopter Autopilot Features

In other embodiments, there are several features which the onboard helicopter autopilot 107 can operate with input from the ground via the two previously mentioned modes (i.e., hand-held and ground station), and they include:

i) Automatic Takeoff

In one embodiment, the helicopter 10 of the present invention has the ability to "Auto takeoff" via the hand-held remote control unit mode, or the wireless ground station unit with computer mode. The computer software program includes a set of commands that instruct the helicopter 10 to lift from the ground into a stationary hovering position at a preset altitude (for example, typically set at 10 meters above the mean sea level of where the helicopter 10 started).

ii) Automatic Landing

In one embodiment, the helicopter 10 of the present invention has the ability to "Auto land" via the hand-held remote control unit mode, or the wireless ground station unit with computer mode. The computer software program includes a set of commands that will instruct the helicopter 10 to maintain a specified GPS 106 position, to descend at a predetermined velocity, and to land on the ground and turn off all rotors 130 and motors 111.

iii) Autonomous Flight Between Waypoints

As discussed above, in one embodiment, the helicopter 10 of the present invention has the ability to fly automatically without human input from predetermined or predefined GPS 106 waypoints, at a specified altitude, specified velocity, and specified GPS latitude and longitude. This instruction will make the helicopter 10 move from a hover position at one GPS position, including a specified altitude, and forward velocity to another GPS waypoint. Then once at the new GPS position, the instructions will include further required helicopter 10 behavior (i.e., hover, or continue to yet another GPS waypoint).

iv) Safety Return

In one embodiment, the helicopter 10 of the present invention has the ability to perform an automated return to "home" flight function that allows for the helicopter 10 to fly back to a "home" pre-determined GPS latitude and longitude via a pre-determined flight course, at a specified altitude, specified velocity and specified heading. Once this function is triggered by the user, or by a predefined set of conditions, the helicopter 10 will descend at a pre-determined velocity and once on the ground, turn off all rotors 130 and motors 111. The following conditions may create a "home" flight function, or safety return:

a) a pre-defined time frame of a lack of communication time between the helicopter 10 and the user at the hand-held remote control unit or ground station unit, requiring a return to a predetermined "home" GPS latitude and longitude.

b) achieving a pre-determined remaining percentage of total power, which triggers a return to a predetermined "home" GPS latitude and longitude.

c) achieving a specified helicopter 10 health condition (programmed into the software using custom functions), the health conditions including, but not limited to, "real-time" elements, such as battery power, telemetry connectivity, and other key attributes, along with motor temperature, humidity, wind and other conditions.

f) Predetermined Missions Software Program

In an exemplary embodiment, the ground station unit computer software program allows for the creation of pre-determined missions including the capability to download satellite images of terrain with geo-referenced data and develop complete flight plans that include detailed GPS coordinates/way points (i.e., longitude, latitude, velocity, and payload commands) management, and the ability to create height, attitude and helicopter 10 direction, and speed of movement, between all way points. The user can utilize the software program and an input device (i.e., mouse) to the computer, to point and "click", for example, on the geo-referenced map to create, for example, waypoint programming, real time in-flight mission loading or mission changes, mission interrupt, "continue" command at waypoint X, automatic takeoff, and automatic landing.

In one embodiment, the user has the flexibility to switch between the hand-held remote control unit (with or without autopilot 107) and ground station unit during a mission (using a "toggle" switch), or "home" mode (which allows the helicopter 10 to return to a predetermined GPS point and either hover, or land and turn off all rotors/motors). The ability to seamlessly switch into and back from the mission mode completes the ability of the helicopter 10 to have autonomous flight.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A helicopter comprising:
   a central airframe having a plurality of modular components stacked in a vertical manner on each other;
   a component connecting mechanism which connects each of said modular vertical components to each other;
   a plurality of rotor assemblies extending from a plurality of arms connected to one of said plurality of modular components of said airframe, said rotor assemblies each having a rotor thereon with a plurality of rotor blades, said rotors each being mounted horizontally on an end of each of said plurality of arms, an arm connecting system comprising a plurality of connect/disconnect mechanisms disposed in one of said plurality of vertical layers of modular components and which allow each of said plurality of arms to be connected and disconnected to said central airframe, such that said rotors may be interchanged in number, wherein said rotors are interchanged in number by changing the one of said plurality of vertical layers of modular components with another of said plurality of vertical layers of modular components having disposed therein a different number of the plurality of connect/disconnect mechanisms;
   a plurality of landing gear extending from said airframe; and an autopilot disposed within said airframe;
   wherein said autopilot receives wireless instructions for helicopter control, from at least one of a first wireless communication transmitter/receiver disposed in the airframe of the helicopter, said first wireless communication transmitter/receiver that transmits and receives wireless instructions from a ground station unit, or a second wireless transmitter/receiver disposed in the helicopter, that transmits and receives wireless instructions from a hand-held remote control unit.

2. The helicopter of claim 1, wherein said modular vertical components are provided in a plurality of vertical layers, each of which is removed from said central airframe via said component connecting mechanism.

3. The helicopter of claim 1, further comprising:
   a global positioning satellite (GPS) receiver disposed in said airframe and connected to said autopilot.

4. The helicopter of claim 3, wherein said GPS receiver is connected to GPS antennae that receive satellite data, which data is sent in real-time to said autopilot to identify a location of the helicopter in latitude, longitude, altitude, velocity, and in real-time.

5. The helicopter of claim 1, wherein said autopilot uses a plurality of controller connecting mechanisms to connect to separate speed controllers of a plurality of motors, to maneuver the helicopter in any of X, Y or Z directions 6. The helicopter of claim 1, further comprising:
   a third wireless transmitter/receiver connected to said autopilot which sends separate instructions to said autopilot for helicopter control.

7. The helicopter of claim 1, further comprising:
   an electrical system which controls each of said rotors, and which is an adjustable speed regulator for said rotors.

8. The helicopter of claim7, further comprising:
   a plurality of batteries connected to said airframe by a battery connecting mechanism, said plurality of batteries which are controlled by said electrical system, such that said plurality of batteries are not overcharged or stop expending energy before said plurality of batteries are discharged.

9. The helicopter of claim 8, further comprising:
   a daylight-readable LCD screen connected via electrical wiring to said electrical panel and to said autopilot, which displays a status of the helicopter and error codes to a user.

10. The helicopter of claim 9, further comprising:
    a data card which operates with said electrical system, said LCD screen, and said autopilot, to store autopilot data from a predetermined number of helicopter flights.

11. The helicopter of claim 1, further comprising:
    a magnetometer which is connected to said GPS receiver, and allows for input of directional information to said autopilot based upon magnetic compass readings by said magnetometer.

12. The helicopter of claim 8, wherein said battery connecting mechanism for said batteries includes a slide and lock mechanism for each battery.

13. The helicopter of claim 8, wherein said battery connecting mechanism for said batteries includes a single slide-lock battery unit, supported by a rail system on said airframe and on said battery unit.

14. The helicopter of claim 5, wherein said rotors are each connected by each of said plurality of arms to a separate speed controller.

15. The helicopter of claim 1 wherein each of the plurality of connect/disconnect mechanisms comprises an arm connection mechanism which allows each of said plurality of arms with attached rotor assemblies, to be folded parallel with one another in a vertical direction.

16. The helicopter of claim 15, further comprising:
    one of a spring or piston for each of said plurality of arms, which allows each of said plurality of arms to open into a flight position after launch.

17. The helicopter of claim 16, further comprising:
    a rotor guard that connects to each of said plurality of arms and extends beyond a reach of each of said plurality of rotor blades.

18. The helicopter of claim 17, wherein said landing gear comprises a plurality of tubes, said plurality of tubes which are attached to said central airframe by a landing gear connecting mechanism; and
    wherein said landing gear are folded parallel to one another for launch, and can be released by said landing gear connecting mechanism into a landing position after launch.

19. The helicopter of claim 18, wherein the helicopter carries a payload.

20. The helicopter of claim 19, wherein said payload is disposed in a bottom layer of said plurality of layers of said modular components, on a plate which creates a shelf for said payload.

21. The helicopter of claim 19, wherein said payload is a hanging payload mounted below the central airframe of the helicopter.

22. The helicopter of claim 20, wherein said plate is connected to side plates having a gear system that is connected to a servo that allows for 0-180 degree tilting of said payload.

23. The helicopter of claim 19, further comprising wherein said payload is a camera.

24. The helicopter of claim 23, wherein said camera is remote controlled.

25. The helicopter of claim 20, further comprising:
an automated recharge mechanism for said payload, supported in a full connection unit on said bottom layer.

26. The helicopter of claim 25, wherein said airframe is comprised of one of PVC plastic, carbon fiber, or injection-molded plastic and resin.

27. The helicopter of claim 1, wherein said modular vertical components are provided in a plurality of layers assembled together in a vertical, circular stacked arrangement, and said plurality of layers are covered by a dome-shaped cover that secures to a bottom layer of said plurality of layers.

28. The helicopter of claim 27, further comprising:
an air cooling system disposed in said central airframe;
wherein said central airframe includes a central core stacked shelf system, with electronics disposed in an outer ring configuration around a fan of said air cooling system.

29. The helicopter of claim 1, wherein said hand-held remote control unit further comprises:
a video receiver/transmitter disposed in a primary housing, and
a plurality of antennae on said primary housing, for receipt of a video transmission broadcast by the helicopter; and
an LCD screen on a front side of said hand-held remote control unit.

30. The helicopter of claim 29, further comprising:
a portable 12 volt battery pack and integrated wiring disposed in said primary housing.

31. The helicopter of claim 30, further comprising:
a plurality of joy sticks disposed on the front side of said hand-held remote control unit, on either side of said LCD screen, for operation of the helicopter and its payload.

32. The helicopter of claim 29, wherein said ground station unit includes a rechargeable battery.

33. The helicopter of claim 32, wherein said ground station unit includes a portable DVR for each RCA channel; and an additional high gain antenna/patch panel for additional gain.

34. The helicopter of claim 33, wherein said ground station unit utilizes both a remote control (R/C) and/or wireless-connected computer configured with a wireless RS232 port.

* * * * *